Sept. 8, 1925.

B. H. PUTERBAUGH 1,552,505

REVOLVING COLTER FOR BREAKING PLOWS

Filed Sept. 18, 1924

Inventor

BENJAMIN H. PUTERBAUGH,

By Toulmin & Toulmin,

Attorneys

Patented Sept. 8, 1925.

1,552,505

UNITED STATES PATENT OFFICE.

BENJAMIN H. PUTERBAUGH, OF GREENVILLE, OHIO.

REVOLVING COLTER FOR BREAKING PLOWS.

Application filed September 18, 1924. Serial No. 738,361.

*To all whom it may concern:*

Be it known that I, BENJAMIN H. PUTERBAUGH, a citizen of the United States, residing at Greenville, in the county of Darke and State of Ohio, have invented certain new and useful Improvements in Revolving Colters for Breaking Plows, of which the following is a specification, reference being had therein to the accompanying drawing.

My invention relates to improvements in revolving colters designed to be used in connection with breaking plows.

The object of my invention is two-fold—first, that of making a colter which will take a positive hold upon trash, corn stalks, etc. with which it meets in going over a field, and which will so grasp the trash as to tend to hold it in small bunches down against the ground as it revolves and forces its cutting hook against the trash; and secondly, that of actually cutting the land-side of the plow furrow as the colter revolves with the forward travel of the plow to which it is attached.

It will therefore be seen that my purpose is to gather, hold and cut the trash, and at the same time to actually cut into the soil to aid the breaking plow in opening the furrow along the land-side.

These objects I carry into practical effect by means of a single hooked shaped tooth or a plurality of hook-shaped teeth with sharp cutting edges formed by cutting back into the disk within the circumference line; and by reducing the periphery of the disk between the cutting hooks to a sharp edge which when the disk revolves will cut into the earth and aid in forming the land-side of the furrow, so that the one revolving motion of the colter performs the two functions of gathering and cutting the trash and of cutting into the soil.

Figure 1:
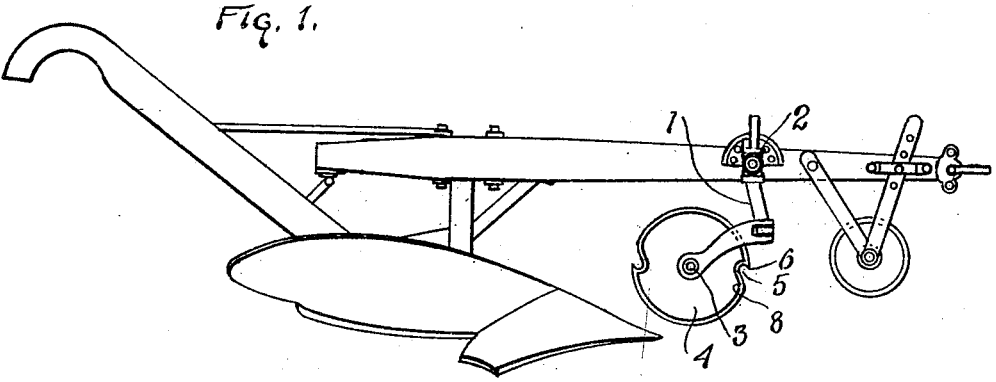
Figure 1 is a side elevation of the conventional breaking plow with my double-cutting colter mounted thereon.
Figure 2:
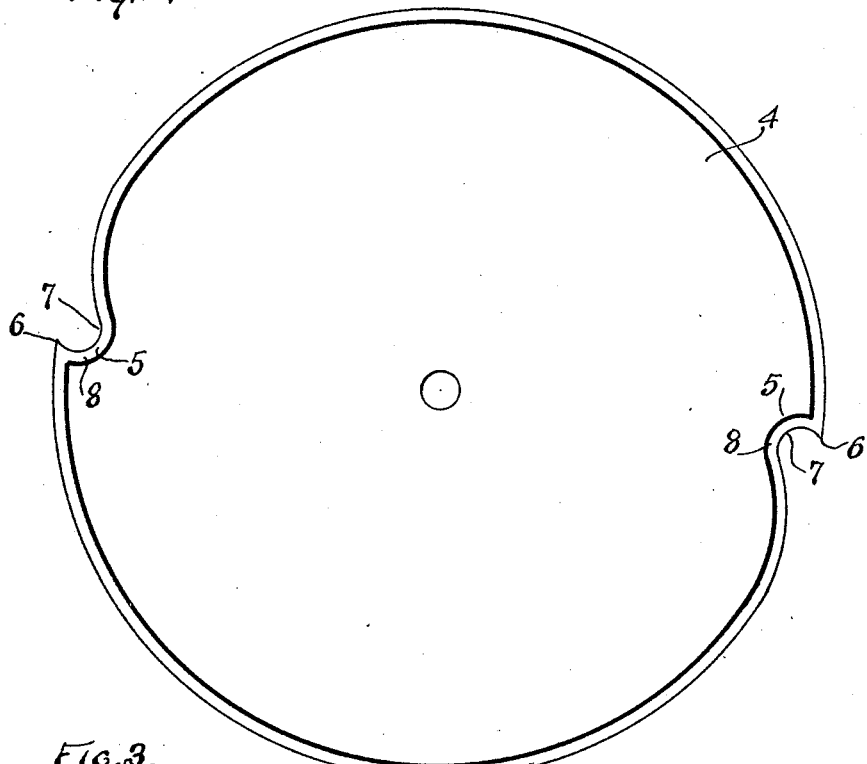
Figure 2 is a side elevation of my improved colter on a larger scale.
Figure 3:
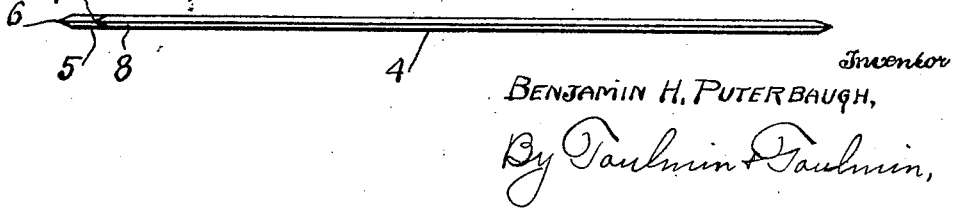
Figure 3 is an edge view of the colter showing more particularly the peripheral cutting edge.

As illustrated in Figure 1, I apply my colter to any of the usual breaking plows. For this purpose I prefer to use a rigid bearing standard 1 secured to the plow beam, as by a clamp 2. The lower end of the standard receives a bolt 3 constituting a stud shaft or axle for the colter.

The colter itself is formed of steel properly tempered to receive and maintain a sharp cutting edge. It is designated as a whole by the numeral 4. At one or more points on its periphery it is fashioned with trash gathering and cutting hooks 5, but it will be understood that a colter provided with only one such hook will be effective. The apex 6 of these hooks is at the juncture of the periphery of the disk and the curved cutting edge 7 of the hook. This cutting edge is curved back and under the apex so as to form a sort of hook adapted to enter and gather trash such as weeds, small twigs, and corn stalks, the latter particularly. As the hook gathers the trash the curved edge 7 forms a sort of pocket which holds the trash within the grasp of the hook while the trash is being pressed hard against the ground as the hook cuts through it due to the revolving action of the disk. The curved edge 7 is sharpened as by being beveled on either side as indicated at 8 so that the hook presents also a sharp cutting edge in addition to its pocket formation. In practice I have found this feature to work excellently and to aid in the performance of the breaking plow by making short work of these trashy obstacles which otherwise would gather on the forward edge of the land-side of the plow and ultimately require the plowman to stop and clear it out by hand. Instead, with this invention the trash is severed and a portion of it remains on the soil at the land-side, and the other falls over into the furrow as the mold board rolls the earth over in advancing through the soil.

Then another feature of my invention is that it acts to cut the soil along the land-side in advance of the plow. To this end the periphery of the disk is beveled on both sides to a sharp cutting edge throughout the distance between the cutting hooks. This feature enables me to set the colter lower so that it will enter more deeply into the soil and not only cut it, but by reason of the depth to which the colter descends, it will be the more positively rotated and thereby more forcibly cut the trash through the instrumentality of the cutting hooks.

It will thus be seen that my improved revolving colter constructed as described, constitutes an efficient and useful implement, facts which I have ascertained in the actual use of the colter in connection with breaking plows in pursuit of my vocation as a farmer.

Having thus fully described my invention, what I claim as new and desire to secure by Letters Patent of the United States, is:

A colter comprising a disc fashioned on its periphery with a sharp cutting edge, one or more hooks formed on said edge, and a curved pocket or pockets also formed on such edge and contiguous each with a hook, said parts having such sharp cutting edge, the hook being adapted to gather trash and direct it within the adjacent curved pocket.

In testimony whereof, I affix my signature.

BENJAMIN H. PUTERBAUGH.